United States Patent [19]
Janssen

[11] 3,894,276
[45] July 8, 1975

[54] LINEAR STEPPING MOTOR USING TWO RETAINING ELECTROMAGNETS AND A DEFORMABLE ELECTROMAGNET

[75] Inventor: Peter Johannes Michiel Janssen, Emmasingel, Eindhoven, Netherlands

[73] Assignee: U.S. Philips Corporation, New York, N.Y.

[22] Filed: Feb. 14, 1974

[21] Appl. No.: 442,502

[30] Foreign Application Priority Data
Mar. 2, 1973  Netherlands ...................... 7302941

[52] U.S. Cl. .................... 318/135; 310/13; 310/15; 179/100.3 V; 318/118
[51] Int. Cl. .......................................... H02k 41/02
[58] Field of Search ............ 310/12, 13, 15, 27, 20; 318/115, 118, 135; 179/100.3 V; 178/DIG. 22, 6.7 R; 235/151.3

[56] References Cited
UNITED STATES PATENTS
| | | | |
|---|---|---|---|
| 2,506,141 | 5/1950 | Drouin | 310/26 X |
| 3,371,156 | 2/1968 | Frohbach et al. | 179/100.3 V |
| 3,573,809 | 4/1971 | Magnien | 179/100.3 V |

*Primary Examiner*—Gerald Goldberg
*Attorney, Agent, or Firm*—Frank R. Trifari; Simon L. Cohen

[57] ABSTRACT

A linear motor is described which performs stepwise movements. Between two controllable retaining elements a sliding element is provided in the form of an electromagnet having two oppositely arranged poles, which at one side are separated by a gap and at the other side are elastically coupled, said electromagnet being subject to a deformation under the influence of an electric current.

10 Claims, 5 Drawing Figures

LINEAR STEPPING MOTOR USING TWO RETAINING ELECTROMAGNETS AND A DEFORMABLE ELECTROMAGNET

The invention relates to a linear motor with a drive member which performs a rectilinear movement, which is determined by a sliding element, the sliding element being disposed between, and rigidly conneted to, two controllable retaining elements, and the sliding element being capable of being deformed under the influence of an electrical control parameter, so that the distance between the retaining elements varies.

Such a motor is known, inter alia, from the published German Pat. application 1,933,205. In the motor which is described in said Patent Application, the sliding element contains a ceramic body which exhibits the electrostrictive or the magnetostrictive effect. The two ends of said body are each coupled via a rigid connection to a retaining element, for example an electromagnet, which can be clamped on a guide rail. When a direct voltage is applied to the electrostrictive element, said element will be subject to a variation in length. In the known motor a first retaining element is clamped on the guide rail during the expansion in the longitudinal direction of the electrostrictive element, while the second retaining element can move over the guide rail. On completion of the expansion, the second retaining element is clamped in position, and subsequently the first retaining element is released. By subsequently switching off the voltage to the electrostrictive element, the complete driving member can be moved over a length which is equal to the total variation in length of the electrostrictive element.

Such a motor can especially be employed when small, controllable stepwise displacements at high speed are required. Rapid displacements over small distances are inter alia, required in a device for optically reading a disc-shaped record carrier, on which information is stored in one spiral track or in a great number of concentric tracks. In order to permit all concentric tracks or the complete spiral track to be read, a (scanning) radiation spot which is projected onto the record carrier should be displaced radially relative to the record carrier. For positioning the scanning spot on the record carrier use is generally made of a fine and a coarse control. Fine control is, for example, realized by means of a rotatable mirror. Said mirror can effect a very rapid displacement of the scanning spot within a fairly limited control range. When the desired displacement of the scanning spot can no longer be achieved by means of the mirror, a second control, the coarse control becomes operative. By means of this the read system is bodily displaced in a radial direction relative to the record carrier.

Such a displacement can be achieved by means of an electric motor which via a number of gear-wheels and a belt drives the reading head which produces the radiation spot and which accommodates the rotatable mirror. Mechanically this is a rather intricate and therefore fairly expensive solution. Stringent requirements have to be imposed on the mechanical components. Moreover, the control band width is fairly small.

To obviate these drawbacks the motor with sliding element described hereinbefore might be employed for driving the reading head. However, for the electrostrictive or the magnetostrictive element used in this motor the relative length variation per unit of voltage or unit of current intensity is very small, so that for an acceptable length variation an undesirably high control voltage is required. Moreover, the electrostrictive or magnetostrictive materials have a certain limit above which a voltage increase or current increase no longer results in a further length variation. The maximum length variation of an electrostrictive or magnetostrictive element is of the order of magnitude of 0.01 percent of the original length of said element. The displacement per step of the known motor will therefore be very small. As a result, undesired second-order effects will play a relatively important part. Moreover, the displacement per unit of time is small.

This last aspect is particularly disadvantageous when in a read device, in addition to the possibility of reading a record carrier in the sequence in which it is written, it is also required that the information which is stored in entirely different points on the record carrier can be read rapidly in succession. The scanning spot should then be capable of being displaced over relatively large distances at high speed, which is hardly possible with the known motor.

It is an object of the invention to provide a linear motor of the type mentioned in the preamble which is particularly suited to perform this type of movements. The motor according to the invention is characterized in that the sliding element consists of an electromagnet having two identical oppositely arranged poles which at one side are separated by a gap and at the other side are elastically coupled, the dimension of the gap being variable in the direction of movement. When the electromagnet is energized the poles exert forces on each other, so that the magnet body is subject to a deformation. This deformation results in a displacement of a drive rod for the object to be displaced, which is rigidly connected to the magnet body. The deformation is such that a sufficiently great movement is obtained.

Obviously, the motor according to the invention cannot only be used in a device for optically reading a disc-shaped record carrier, but can generally be employed in those cases where rectilinear displacements at relatively high speed and with high control accuracy are to be realized.

The invention will now be described, by way of example, with reference to the drawing, in which.

Figure 1:
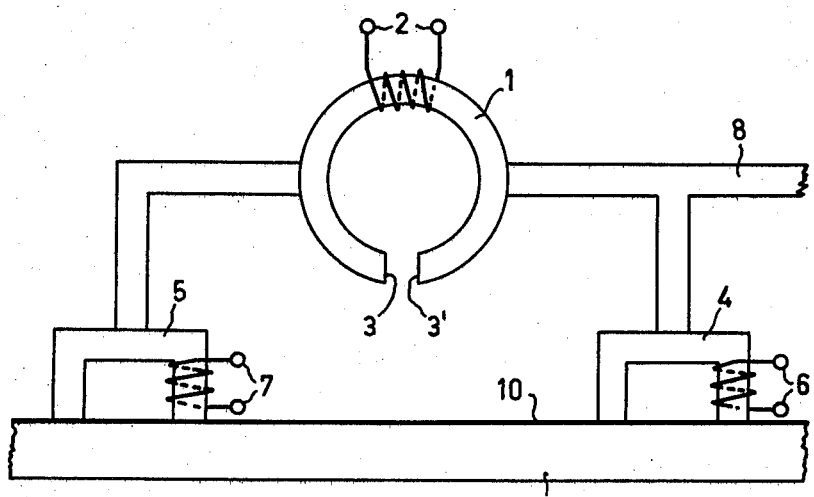
FIG. 1 shows an embodiment of a motor according to the invention.

As is shown in FIG. 1 a motor according to the invention may comprise a ring 1 of a magnetizable material, for example soft-iron, which is interrupted by an air gap. The ring is provided with a winding 2 for carrying a magnetizing current. The air gap is bounded by the pole faces 3 and 3'. Two retaining elements are rigidly connected to the ring 1 and in this case take the form of electromagnets 4 and 5. Instead of electromagnets it is also possible to use electrostrictive elements as retaining elements. The electromagnets 4 and 5 can be clamped on the guide rail 9, which may also consist of soft iron, by feeding a current through the winding 6 and 7 respectively.

The motor operates as follows:

For a movement of the drive rod 8 to the left the electromagnet 5 is energized first, so that this magnet is clamped onto the guide rail 9. Subsequently, a magnetizing current is fed through the winding 2 of the annular magnet core 1, so that magnetic forces develop at the pole faces 3 and 3'. These faces attract each other and the ring is deformed in accordance with the forces at the faces, and thus the current through the winding 2. As the left part of the ring is clamped in position via the electromagnet 5, only the right part of the ring can move to the left. In addition to the non-energized electromagnet 4, the drive rod 8 also moves to the left over a distance which is determined by the deformation of the ring.

Subsequently, electromagnet 4 is clamped in position. By interrupting the current through the winding 7, the electromagnet 5 is released. Finally, when the current through the winding 2 is interrupted, so that the magnetic forces in the ring 1 disappear and the ring can assume its original shape again, the electromagnet 5 is moved to the left over the same distance as the electromagnet 4 at a previous instant. The motor has then performed one step.

To perform a movement to the right, the electromagnet 4 is energized first. Subsequently a current is fed through the winding 2, so that owing to the forces at the pole faces 3 and 3' these faces are moved towards each other and the ring is deformed. As a result, the non-energized magnet 5 is drawn towards the right. Subsequently, this electromagnet is clamped in position, while the energization of the electromagnet 4 is interrupted. By then allowing the ring 1 to resume its original shape by interrupting the current through the winding 2, the electromagnet 4 as well as the drive rod 8 can move to the right.

Instead of an annular shape the magnet body may also have different shapes, such as for example a rectangular shape.

The displacement per step is determined by the magnitude of the current, which is fed through the energizing coil 2, and the internal elasticity of the ring 1. For a specific ring, which consequently has a constant elasticity, the displacement per step can be varied by varying the energizing current through the winding 2.

Therefore, it is necessary that the magnet body possesses a certain elasticity. For this, use can be made of the elasticity in the magnetic material, such as in the ring of FIG. 1. It is also possible to provide separate elastic elements in the ring. An example of such an embodiment of a sliding element according to the invention is shown in FIG. 2.

In the magnet body according to this Figure two gaps 23 and 23' are formed. These gaps are filled with an elastic material, for example rubber. The poles 21 and 21' are magnetically isolated from each other and carry a separate winding 22 and 22' respectively. In principle, a winding on either of the poles may suffice.

Figure 3:
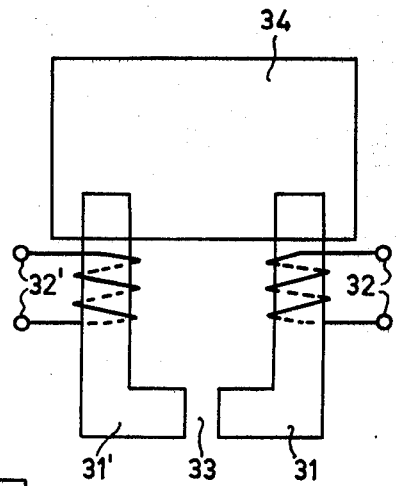

Another embodiment of a sliding element according to the invention is shown in FIG. 3. The poles 31 and 31' are isolated from each other by an air gap 33 and secured in a common plate or block 34 of an elastic material, for example rubber. Said plate or block may or may not be of a magnetic material but is elastic in any case.

Figure 2:
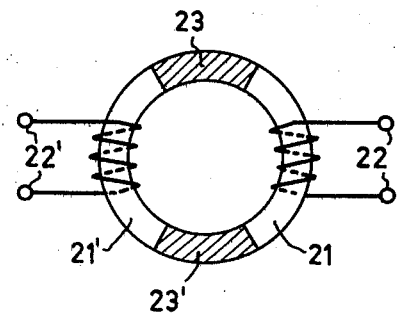
FIG. 2 and 3 are side elevations of embodiments of a sliding element according to the invention.

When using the sliding elements according to the FIGS. 1, 2 or 3, the drive rod 8, in addition to a displacement in the longitudinal direction, may also be subject to a displacement in a direction perpendicular thereto. The influence of such a second-order effect is especially marked in the case of small displacements per step of the motor. A better rectilinear movement of the drive rod can be achieved by means of the electromagnet according to the invention which is shown in top plan view in FIG. 4.

The magnet poles 41 and 41', which are separated by an air gap 43 are secured to separate plates 44 and 45 of a magnetizable material. These plates are magnetically coupled by the cross-pieces 46 and 47 of a magnetizable material. The thickness of the plates 44 and 45 is considerably smaller than the other dimensions of the plates. Around the poles one winding 42 is arranged. If a current is fed through this winding the poles 41 and 41' will exert forces on each other, so that these poles move towards each other in accordance with a straight line. Via one of plates this movement is imparted to the drive rod (8 in FIG. 1).

If the magnetizable material itself must be elastic, a non-magnetizable elastic material, for example a synthetic material, in which particles of a magnetizable material are embedded may be used for this.

When using electromagnets, 4 and 5 in FIG. 1, as retaining elements, a certain remanent magnetic force will persist after switching off the current through the windings. This may give rise to undesired movements of the drive rod and excessive wear. According to the invention the remanent magnetic force can be considerably reduced by providing an artificial gap between the magnet poles of the retaining elements and the guide rail, in the form of a layer of non-magnetizable material, such as the layer 10 in FIG. 1. This layer causes such a shift in the B-H characteristic of the electromagnets 4 and 5 that the remanent magnetic force closely approximates to zero.

Furthermore, in practice, during the movement of the electromagnets 4 and 5 not only horizontal but also vertical forces may be exerted on these magnets. As a result, pieces of material might be knocked off the magnets or the guide rail, so that the originally smooth surfaces of the magnet poles and the guide rail become rough, resulting in high frictional forces. This will adversely affect the displacement accuracy. According to the invention this can be avoided by making the layer for the suppression of the remanent magnetism of a wear-resistant material. Examples of such materials are chromium, non-magnetic nickel or a synthetic material such as Teflon or nylon. The thickness of the layer (layer 10 in FIG. 1) is for example 10 $\mu$m.

Figure 5:
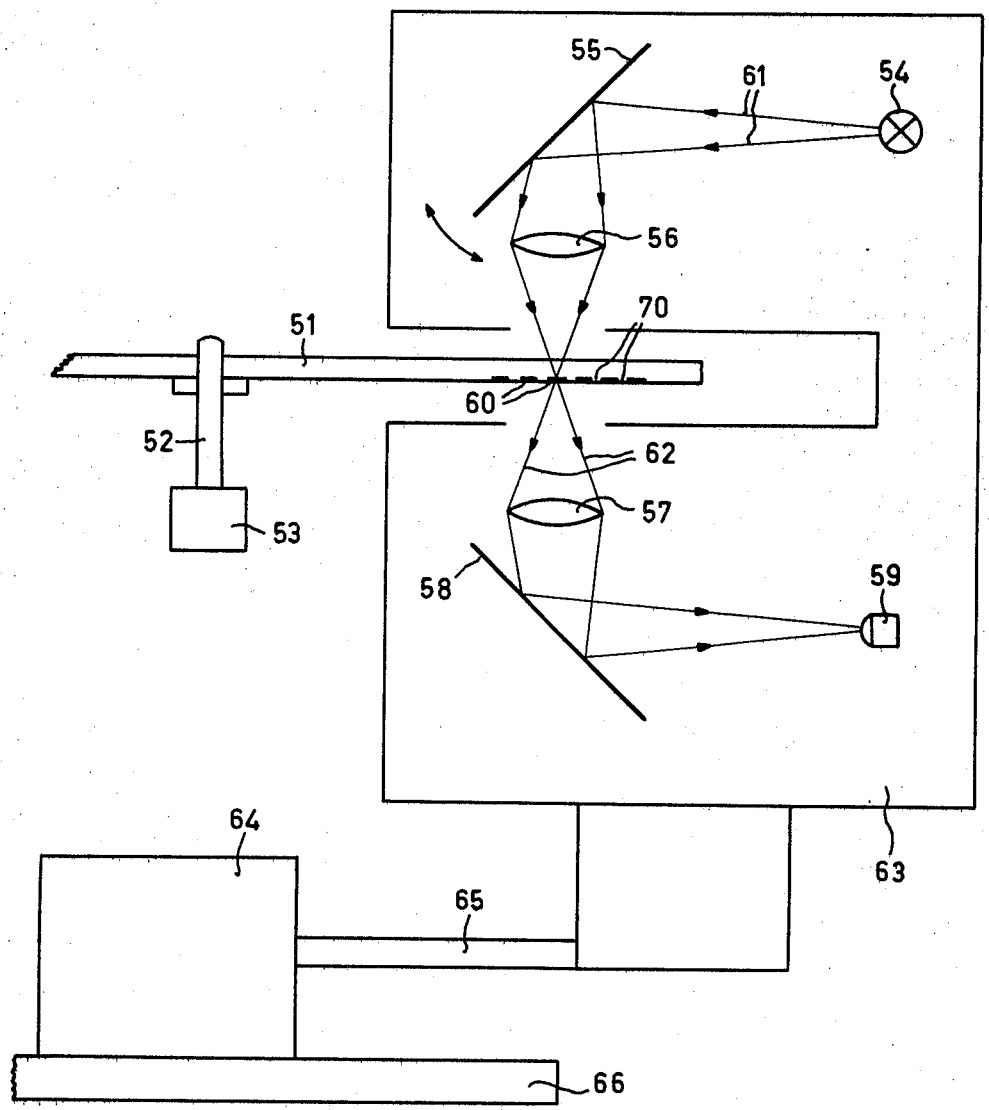
FIG. 5 illustrates how a motor according to the invention can be used in a device for optically read a disc-shaped record carrier.

FIG. 5 shows how a linear motor according to the invention can be employed in a device for optically reading a disc-shaped record carrier. In this device the disc-shaped record carrier 51, which is shown in radial cross-section, is rotated by a shaft 52 which is driven by a motor 53. The read beam 61, which is produced by a radiation source 54, for example a laser, is reflected to the record carrier 51 by the plane mirror 55. The lens 56 produces an image of the source 54 in the form of a scanning spot, whose order of magnitude corresponds to that of the smallest detail in the optical structure on the record carrier 51.

On the record carrier 1 a multiplicity of concentric tracks 60 or one continuous spiral track are provided, in this case at the underside of the record carrier. Each track comprises a large number of optically different areas and intermediate areas. Between the information tracks 60 information-free intermediate strips 70 are found. The lengths of the areas and the intermediate areas represent the stored information. A radiation beam which is modulated by an information track, exhibits pulse-shaped variations in time, corresponding to the sequence of areas and intermediate areas in said information track.

The modulated read beam 62 is concentrated onto a radiation-sensitive detector 59 by a lens 57 via a plane mirror 58. The output of said detector may be connected to known means, not shown, for converting the electrical output signal of the detector 59 into picture and/or sound.

In order to enable the entire track to be read in the case of a spiral track or to read all tracks in case of a large number of concentric tracks, the scanning spot and the record carrier should be moved radially relative to each other. For this purpose, the mirror 55 can be disposed rotatably in the read device in a similar way as described in the previous co-pending U.S. Pat. application Ser. No. 335,934, filed Feb. 26, 1973, and now U.S. Pat. No. 3,854,015, issued Dec. 10, 1974. The means, not shown, for driving the mirror 55 are then controlled by an electrical signal derived from previously proposed optoelectronic systems, by means of which the position of the scanning spot relative to the track portion to be read can be determined. An example of such a system is the system described in the previous U.S. Pat. application Ser. No. 229,291, filed Feb. 25, 1972 and now U.S. Pat. No. 3,833,796, issued Sept. 3, 1974, in which a part of the grating, shaped structure around the track portion to be read is projected onto a detector which is located behind a grating.

With the aid of the mirror 55 the position of the scanning spot can be readjusted very rapidly. However, the travel of the mirror 55 is limited to a maximum, for example, the mirror 55 permits of radially scanning an area of 300 $\mu$m. At a width of 1 $\mu$m for the information track and 1 $\mu$m for the intermediate strips this means that approximately 150 information tracks can be covered by rotation of the mirror 55.

In addition to fine control with the aid of the rotatable mirror 55, a second control is provided, by which the scanning spot can be moved over the entire record carrier. This control consists in that the reading head 63, which accommodates the optical elements of the read device, is moved relative to the record carrier. For this, the device is provided with the motor according to the invention, schematically represented by 64. The motor 64 may take the form of the motor shown in FIG. 1, or may be provided with a sliding element in accordance with one of the FIGS. 2, 3 or 4. The drive rod 65 imparts the movement of the motor 64 over the rail 66 to the housing.

Figure 4:
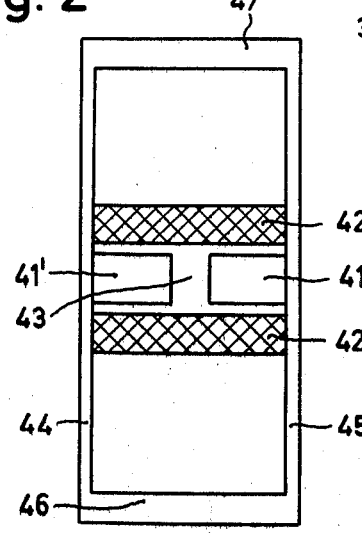
FIG. 4 is a top-plan view of a different embodiment of a sliding element according to the invention.

In a practical embodiment of a motor with an electromagnet according to FIG. 4 the distance between the poles in the non-energized condition was approximately 10 $\mu$m. In the energized condition the poles exerted a force of approximately 10 kgf/cm$^2$ on each other. The control pulses for the motor were derived from an alternating voltage having a frequency of 50 Hz. Thus, the motor was capable of performing a displacement at a speed of 0.5 mm/sec, thus enabling a displaced object to be positioned accurately within 10 $\mu$m at the specified magnetic force of 10 kgf/cm$^2$. If the object need not be positioned that accurately, for example, by the provision of a fine control, the displacement per step of the motor can be increased, for example to 100 $\mu$m and the frequency of the steps, can be reduced accordingly to, for example, 5 Hz while maintaining the speed.

Both the information tracks and the information-free intermediate strips of the record carrier of FIG. 5 may, for example, be 1 $\mu$m wide. If the record carrier 25 performs 25 revolutions per second, the scanning spot should be moved in the radial direction with a speed of approximately 50 $\mu$/sec. For normal reading, i.e. the sequential scanning of the consecutive tracks, the above-mentioned speed of 0.5 mm/sec is therefore not necessary. This higher speed can be used when it is required to "leaf through" the record carrier, i.e. to reproduce the information stored at different points situated at a comparatively great distances from each other, with the least possible delay.

In the description of FIG. 5 the situation is considered in which the motor moves the reading head which accommodates the optical elements of the read device. Obviously, the record carrier itself can also be moved in a radial direction relative to the optical elements by means of the motor according to the invention, for example, by moving the rotary shaft 52 together with the motor 53 in the radial direction by means of a motor according to the invention.

Besides for optically reading a disc-shaped record carrier, the motor according to the invention can also be used for moving a pick-up arm over a record carrier in the lateral direction of the tracks, said record carrier being mechanically scanned like a phonograph record or magnetically like a magnetic disc store.

An entirely different use of a linear motor according to the invention lies in the field of the so-called micromanipulators, by means of which very accurate movements of accessories or tools can be achieved within closed spaces.

In general, the motor according to the invention can be employed in cases where rectilinear displacements with high accuracy and at high speed are to be realized.

What is claimed is:

1. A linear motor comprising a first electromagnetic retaining member, a second electromagnetic retaining member, a magnetically permeable surface proximate said first and second electromagnetic retaining members whereby motion of said retaining members is selectively retarded by energizing said electromagnetic retaining members, an electromagnetic sliding element comprising an electromagnet having a pair of oppositely arranged poles separated by a gap on one side of said sliding element, an elastic coupling on another side of said sliding element, said gap being selectively narrowed in response to energization of said sliding element electromagnet, means for mechanically connecting one of said poles to said first electromagnetic retaining member, and means for connecting said second electromagnetic retaining member to another of said poles, whereby successive energization of said first electromagnetic retaining member, said sliding element electromagnet and said second electromagnetic retaining member moves said linear motor in the direction of said gap motion.

2. A linear motor as claimed in claim 1, whereby the poles are connected to each other by a magnetic material.

3. A linear motor as claimed in claim 1, whereby the poles are separated from each other by an elastic non-magnetisable material.

4. A linear motor as claimed in claim 3, wherein at one side the poles are secured in a block of an elastic non-magnetisable material.

5. A linear motor as claimed in claim 3, wherein the poles are annular segments which at both sides are separated by annular segments of an elastic non-magnetisable material.

6. A linear motor as claimed in claim 1, further comprising a separate thin, flat plate secured to each pole, and cross-pieces interconnecting said flat plates.

7. A linear motor as claimed in claim 1, wherein said magnetically permeable surface comprises a guide rail of a magnetizable material, further comprising a layer of non-magnetizable material between the retaining elements and the guide rail.

8. A linear motor as claimed in claim 7, wherein the layer consists of a wear-resistant material.

9. A device for reading out a flat record carrier on which information is stored in a number of tracks, comprising a scanning head for converting the information into electrical signals, means for moving the record carrier and the scanning head relative to each other in the longitudinal direction of the tracks, and with a linear motor for moving the scanning head and the record carrier relative to each other in the lateral direction of the tracks comprising a linear motor comprising a first electromagnetic retaining member, a second electromagnetic retaining member, a magnetically permeable surface proximate said first and second electromagnetic retaining members whereby motion of said retaining members is selectively retarded by energizing said electromagnetic retaining members, an electromagnetic sliding element comprising an electromagnet having a pair of oppositely arranged poles separated by a gap on one side of said sliding element, an elastic coupling on another side of said sliding element, said gap being selectively narrowed in response to energization of said sliding element electromagnet, means for mechanically connecting one of said poles to said first electromagnetic retaining members, and means for mechanically connecting said second electromagnetic retaining member to another of said poles, whereby successive energization of said first electromagnetic retaining member, said sliding element electromagnet and said second electromagnetic retaining member moves said linear motor in the direction of said gap motion.

10. A device as claimed in claim 9, the record carrier carrying optically readable tracks and being scanned by means of a read beam, further comprising an opto-electronic system provided in the device, for providing a signal corresponding to the position of the read beam in the lateral direction of the tracks, and means for connecting said signal to the linear motor.

* * * * *